UNITED STATES PATENT OFFICE.

MARTIN ROHMER, OF GERSTHOFEN, NEAR AUGSBURG, GERMANY, ASSIGNOR TO FARBWERKE VORM. MEISTER LUCIUS & BRÜNING, OF HÖCHST-ON-THE-MAIN, GERMANY, A CORPORATION OF GERMANY.

PROCESS OF PRODUCING NITROGEN SIMULTANEOUSLY WITH OXIDS OF NITROGEN.

1,096,392. Specification of Letters Patent. Patented May 12, 1914.

No Drawing. Application filed February 7, 1913. Serial No. 746,958.

*To all whom it may concern:*

Be it known that I, MARTIN ROHMER, Ph. D., chemist, a citizen of the Empire of Germany, residing at Gersthofen, near Augsburg, Germany, have invented certain new and useful Improvements in the Process of Producing Nitrogen Simultaneously with Oxids of Nitrogen, of which the following is a specification.

The known processes for converting atmospheric nitrogen into ammonia,—for instance by uniting the nitrogen with hydrogen, or by fixing the nitrogen in the form of nitrids and then decomposing the latter with water,—can be carried out economically only if the isolation of the atmospheric nitrogen does not cause great expense.

My present invention is a process of cheaply obtaining nitrogen from air by the combustion of ammonia in air, with simultaneous formation of lower or higher oxids of nitrogen.

The essential feature of the new process is the use of a reaction-mixture of air and ammonia containing a high percentage of ammonia, *e. g.* 10–14.5%, the proportion of air being such as to provide just sufficient oxygen for oxidation of the hydrogen-component of the ammonia to water and of its nitrogen-component to lower or higher oxids of nitrogen, leaving pure atmospheric nitrogen as a residue. My discovery that such high percentages of ammonia may be completely burnt in atmospheric air, in the presence of suitable contact substances, is surprising, because it was hitherto generally presumed that high concentrations should be avoided.

My new process is of great technical importance from two points of view: On the one hand, the oxids of nitrogen produced by the combustion and subsequent oxidation can be easily and completely obtained from the combustion gases, owing to their very high concentration; on the other hand the escaping gases, as they are free from oxygen and consist of pure atmospheric nitrogen, may again be utilized in any desired manner for the synthesis of the ammonia serving as starting material.

The new process can be carried out in different ways accordingly as it is desired to produce, besides pure atmospheric nitrogen, particularly nitric acid or nitrates or nitrites. For the combustion, a simple contact apparatus and very thin layers of the catalytic material will suffice in every case. Of course, in consequence of the high concentrations, the evolution of heat is very considerable, so that even when using small apparatus the heat must be kept down in order to maintain for the reaction the favorable temperature of 550–650° C. This should, for instance, be done when burning two cubic meters of a mixture of ammonia with air in an iron tube of 25 mm. bore within one hour. However in this case the surface of the catalytically acting material, *e. g.* platinum, need not exceed 5 sqcm., so that it is only necessary to intercalate into the iron tube a small quantity of platinized asbestos, a multiple wire netting, a finely perforated platinum-sheet, a narrow platinum-tube or the like. It is an essential condition in this process, particularly when the highest concentrations are used, that the mixture of the ammonia with air be uniform, because at points where the amount of ammonia is in excess, losses are caused by the action of the excess of ammonia or its hydrogen upon the nitric oxid (NO) already formed. For this reason it is advantageous to prepare the mixture of ammonia with air beforehand.

The following examples illustrate my invention:

Example I: A mixture of ammonia with air, containing 10.7 per cent. of ammonia, is burnt in the contact chamber and thus nitric oxid (NO) is obtained, with a yield of nearly 100 per cent. in proportion to the nitrogen contained in the ammonia. This nitric oxid then oxidizes secondarily into nitrogen tetroxid ($N_2O_4$) upon cooling, by means of the whole remaining portion of oxygen. If there is sufficient cooling, the water from combustion of the hydrogen also separates, and forms, in consequence of its undergoing a partial reaction with the nitrogen tetroxid, an aqueous nitric acid. The oxygen required for this third oxidation process is abstracted from another portion of the nitrogen tetroxid, with reformation of some nitric oxid (NO). If there is separation of nitric acid, ammonia of somewhat lower concentration should therefore be used so that, after the elimination of the aqueous nitric acid and nitrogen tetroxid as such or in the form of nitrate and nitrite, the escaping gases will be free from nitric oxid (NO).

Example II: A mixture of ammonia with air, containing for instance 12.3 per cent. of ammonia, is burnt and thus there is also obtained nitric oxid (NO), the yield being very good. After cooling, the quantity of the remaining oxygen is only sufficient to convert half of the nitric oxid into nitrogen tetroxid. Thus a mixture of nitric oxid (NO) and nitrogen tetroxid is produced, which, when further cooled, forms nitrogen trioxid ($N_2O_3$), which, by absorption in caustic soda lye, can be most easily and completely converted into the valuable sodium nitrite. For the reason explained in Example I, it may be expedient to use ammonia of a somewhat lower concentration in order to obtain nitrogen free from nitric oxid.

Example III: If ammonia of a still higher concentration, for instance of 14–14½ per cent. strength is used, no secondary oxidation of the nitric oxid into tetroxid occurs on cooling, the combustion gases no longer become brown on cooling, and the water of combustion separates as such. To obtain nitrogen-oxygen compounds, so much fresh air is introduced, after the condensation of the water, as is required for carrying the oxidation into nitrogen trioxid or nitrogen tetroxid to the desired degree. Pure atmospheric nitrogen is delivered when the reaction-gases have been passed through the cooling- and absorbing-apparatus.

Example IV: When using ammonia of such concentrations as stated in Examples I and II, the formation of diluted nitric acid can be avoided. If, for instance by rapid cooling in narrow tubes, the secondary, slowly-proceeding oxidation of the nitric oxid into nitrogen peroxid is prevented, the water of combustion separates. When the gases have passed through the condensation-apparatus, the current of gas is retarded in order to effect the oxidation, so that, if the concentration of the ammonia amounts, for instance, to 12.3 per cent., there is obtained in the alkaline absorption-apparatus, nitrite alone, and at the end of the apparatus pure atmospheric nitrogen.

Having now described my invention, what I claim is:

1. The process of producing substantially pure nitrogen and nitrogen oxids, which consists in burning ammonia in air, the proportion of air in the reaction mixture being, with reference to the product desired, such as to provide just sufficient oxygen for oxidation of the hydrogen component of the ammonia to water and of its nitrogen component to lower or higher oxids of nitrogen leaving pure nitrogen as a residue.

2. The cyclical process of producing nitrogen oxids, which consists in burning ammonia in air, the ammonia being in sufficient proportion for complete utilization of the oxygen of the air, removing the nitrogen oxids from the reaction products, and utilizing the substantially pure nitrogen for the synthesis of further quantities of ammonia for use in a repetition of the process.

In testimony whereof, I affix my signature in presence of two witnesses.

MARTIN ROHMER.

Witnesses:
JOHANNA STERN,
RICHARD LENY.